US009356832B2

(12) United States Patent
Gunnarsson et al.

(10) Patent No.: US 9,356,832 B2
(45) Date of Patent: May 31, 2016

(54) METHOD AND ARRANGEMENT FOR OPTIMIZATION OF NETWORK ELEMENT SETTINGS

(75) Inventors: Fredrik Gunnarsson, Linköping (SE); Mehdi Amirijoo, Linköping (SE); Johan Moe, Mantorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 161 days.

(21) Appl. No.: 14/366,580

(22) PCT Filed: Dec. 19, 2011

(86) PCT No.: PCT/SE2011/051540
§ 371 (c)(1),
(2), (4) Date: Jun. 18, 2014

(87) PCT Pub. No.: WO2013/095217
PCT Pub. Date: Jun. 27, 2013

(65) Prior Publication Data
US 2015/0023209 A1   Jan. 22, 2015

(51) Int. Cl.
*H04L 12/28* (2006.01)
*H04L 12/24* (2006.01)
*H04W 24/02* (2009.01)
*H04W 16/18* (2009.01)
*H04W 84/18* (2009.01)

(52) U.S. Cl.
CPC .......... *H04L 41/0823* (2013.01); *H04W 16/18* (2013.01); *H04W 24/02* (2013.01); *H04W 84/18* (2013.01)

(58) Field of Classification Search
None
See application file for complete search history.

(56) References Cited

U.S. PATENT DOCUMENTS 8,983,453 B1 * 3/2015 On ................. H04W 24/02
370/252
2007/0109972 A1   5/2007 MacDonald
(Continued)

FOREIGN PATENT DOCUMENTS

WO   WO 2010/104141 A1   9/2010

OTHER PUBLICATIONS

Supplementary European Search Report corresponding to European Application No. 11878267.1-1854, dated May 7, 2015; 3 pages.
(Continued)

*Primary Examiner* — Minh-Trang Nguyen
(74) *Attorney, Agent, or Firm* — Patent Portfolio Builders, PLLC

(57) ABSTRACT

The invention relates to method and arrangement for automated optimization of network element settings in a wireless network. For a first optimization state, a first forward triggering condition and a first range of network element settings, allowable in first network element settings optimization are determined. For a further automated optimization state, determining a further forward triggering condition, and a further range of network element settings, allowable in a further network element setting optimization. An initial set of network element settings is assigned to an initial automated optimization state. The first forward triggering condition is evaluated and a migration to the first automated optimization state is performed upon fulfillment of the first forward triggering condition. A further forward triggering condition is evaluated and a migration to a further automated optimization state is performed upon the further forward triggering condition. The migrating is repeated until reaching a final automated optimization state.

10 Claims, 6 Drawing Sheets

(56) References Cited

U.S. PATENT DOCUMENTS

| | | | | |
|---|---|---|---|---|
| 2007/0214283 | A1* | 9/2007 | Metke | H04L 29/12066 709/245 |
| 2010/0299419 | A1* | 11/2010 | Ramankutty | H04W 24/02 709/221 |
| 2011/0081897 | A1 | 4/2011 | Beattie, Jr. et al. | |

OTHER PUBLICATIONS

3GPP TS 32.521 V9.0.0 (Mar. 2010), 3GPP, Technical Specification, "3rd Generation Partnership Project; Technical Specification Group Services and System Aspects; Telecommunications Management; Self-Organized Networks (SON) Policy Network Resource Model (NRM) Integration Reference Point (IRP); Requirements (Release 9)" 650 Route des Lucioles—Sophia Antipolis, Valbonne, France, 24 pp.

International Search Report, PCT Application No. PCT/SE2011/051540, Dec. 21, 2012.

Written Opinion of the International Searching Authority, PCT Application No. PCT/SE2011/051540, Dec. 21, 2012.

Döttling et al., "Challenges in Mobile Network Operation: Towards Self-Optimizing Networks", *IEEE International Conference on Acoustics, Speech and Signal Processing*, 2009, Apr. 19-24, 2009, pp. 3609-3612.

Ericsson, "Power Control for PRACH", Agenda Item 6.3.2, TSG-RAN WG1, R1-080879, Sorrento, Italy, Feb. 11-15, 2008, 2 pp.

Hu et al., "Self-Configuration and Self-Optimization for LTE Networks", *IEEE Communications Magazine*, vol. 48, No. 2, Feb. 2010, pp. 94-100.

3G Americas, "The Benefits of SON in LTE—Self-Optimizing and Self-Organizing Networks", Dec. 2009, 26 pp.

3GPP, Technical Report, "3rd Generation Partnership Project; Technical Specification Group Services and Radio Access Network; Evolved Universal Terrestrial Radio Access Network (E-UTRAN); Self-configuring and self-optimizing network use cases and solutions (Release 9)", 3GPP TR 36.902 V9.0.0 (Sep. 2009), 23 pp.

3GPP, Technical Report, "3rd Generation Partnership Project; Technical Specification Group Services and System Aspects; Telecommunication management; Study on management of Evolved Universal Terrestrial Radio Access Network (E-UTRAN) and Evolved Packet Core (EPC) (Release 8)", 3GPP TR 32.816 V8.0.0 (Dec. 2008), 38 pp.

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V8.2.0 (Sep. 2007), 109 pp.

* cited by examiner

DM/NM/NE

METHOD AND ARRANGEMENT FOR OPTIMIZATION OF NETWORK ELEMENT SETTINGS

CROSS REFERENCE TO RELATED APPLICATION

This application is a 35 U.S.C. §371 national stage application of PCT International Application No. PCT/SE2011/051540, filed on 19 Dec. 2011, the disclosure and content of which is incorporated by reference herein in its entirety. The above-referenced PCT International Application was published in the English language as International Publication No. WO 2013/095217 A1 on 27 Jun. 2013.

TECHNICAL FIELD

The present invention relates to a method and an arrangement for automated optimization of network element settings in a wireless network.

BACKGROUND

The architecture of present day mobile network includes a radio access network, a core network and user equipment connecting to the radio access network. The radio access network includes radio base stations or nodes for setting up the connection to the user equipment. Whilst the nodes of the radio access network mainly can be considered as stationary with fixed location, the user equipment is mobile and may take basically any position within the network. Planning, configuring, optimizing, and maintaining a radio access network, the mobile operator must be able to adjust network element settings and re-organize the network according to user equipment behavior.

Present solutions for determining network element settings involve manual planning to dimension and plan the network. Optimization of the network is performed using measurements and statistics. Wireless network operators today have considerable manual effort in network management, e.g., configuring the radio access network. These manual efforts are costly and consume a great part of operational expenditures (OPEX).

e-UTRAN (evolved UMTS Terrestrial Radio Access Network) is a future wireless access network standard optimized for packet data and providing higher data rates. An important E-UTRAN requirement from the operators' side is a significant reduction of the manual effort in network management for this future wireless access system. This involves automation of the tasks typically involved in operating a network; a demand for self-organizing network features. However, such self-organizing features for optimization of network element settings may also affect the overall performance of the network in an unexpected way.

It is a concern of operators that introduction of automated features in the radio access networks will result in an unstable behavior causing serious problems in the network operation. The operators are reluctant to accept Introduction of automated optimization features in a radio network, even though such automated features would be of great assistance in the network management. Thus, there is a conflict between the need for automatic execution of tasks involved in network management and the operator distrust for automatic network optimization. There is a need for a solution that addresses this conflict.

SUMMARY

It is an object of the present invention to provide a method and an arrangement for automated optimization of network element settings in a wireless network whilst reducing the disadvantages of introducing unexpected network performance.

This object is achieved by means of a method for automated optimization of network element settings in a wireless network, gradually introducing the self-organizing network features by means of multiple optimization states.

In accordance with an embodiment of the inventive method an initial set of network element settings are assigned to network elements in an initial optimization state. At least one first forward triggering condition and a first range of network element settings, allowable in first network element settings optimization, are determined for a first optimization state. For at least one further optimization state, at least one further forward triggering condition, and a further range of network element settings, allowable in a further network element setting optimization, is determined. Upon fulfillment of the first forward triggering condition has been confirmed, a migration from the initial optimization state to the first optimization state is performed. Migration from the first optimization state to the further optimization state is initiated following fulfillment of at least one further forward triggering condition. The step of migrating to a further optimization state is repeated until reaching a final optimization state representing the most highly self-organized network allowed.

The object is further achieved by means of an arrangement for automated optimization of network elements in a wireless network. The arrangement includes a smart migration processor receiving performance measurements and comparing these performance measurements to triggering conditions predefined in the processor. The arrangement further includes an automatic mechanism with a limiter including a memory storing parameter settings to be applied for network element settings in the radio access part of the network. The parameter settings are grouped in a set of optimization states. The automatic mechanism for self-organized adjustment of network element settings is controlled by the limiter. The automatic mechanism operates according to an optimization state and performs automatic optimization of network element settings in accordance with an optimization state selected in the limiter.

DETAILED DESCRIPTION

In the following, the invention will be described for e-UTRAN, the air interface of the 3GPP's ($3^{rd}$ Generation Partnership Project) LTE (Long Term Evolution) upgrade path for mobile networks. However, it should be noted that the invention can be applied to other types of networks and standards, e.g., GSM and UTRAN. E-UTRAN is used merely as an exemplifying standard to illustrate the main concept.

Figure 1:
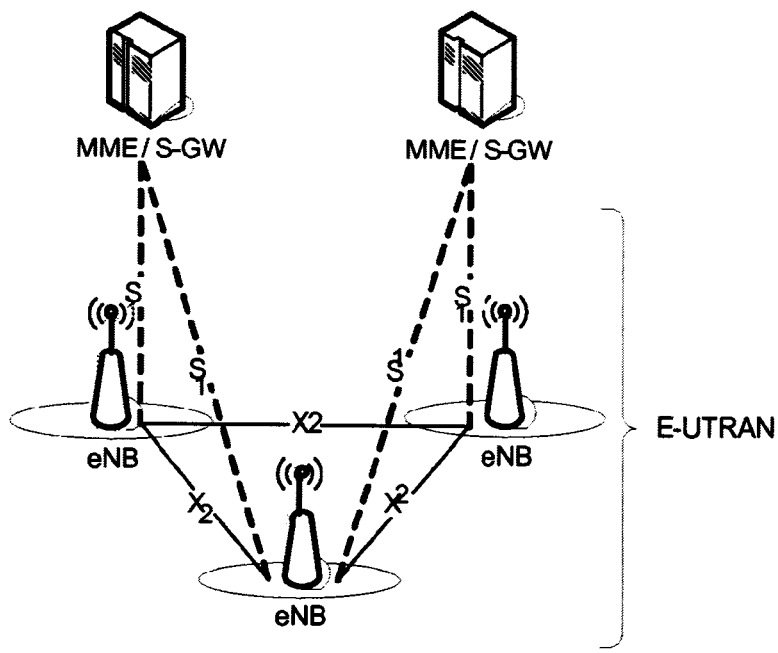
FIG. 1 Radio system architecture
FIG. 2 Network management system
FIG. 3 Flow chart of an embodiment of the inventive method
FIG. 4 Flow chart of another embodiment of the inventive method
FIG. 5 $a$-$d$ schematically disclose operation an embodiment of the inventive method applied to for three optimization states
FIG. 6 discloses functional components of an embodiment of the invention.

FIG. 1 discloses the architecture of such a Long Term Evolution LTE radio system. The E-UTRAN is made up of radio access nodes, also known as eNB nodes, which may be connected to each other. Each eNB contains at least one radio transmitter, receiver, control section and power supply. In addition to radio transmitters, and receivers, eNBs contain resource management and logic control functions that allow eNBs to directly communicate with each other via an X2 interface. eNB functions include radio resource management—RRM, radio bearer control, radio admission control—access control, connection mobility management, resource scheduling between user equipment nodes UEs and eNB radios, header compression, link encryption of the user data stream, packet routing of user data towards its destination (usually to the EPC or other eNBs), scheduling and transmitting paging messages (incoming calls and connection requests), broadcast information coordination (system information), and measurement reporting (to assist in handover decisions).

Each eNB is composed of an antenna system (typically a radio tower), building, and base station radio equipment. Base station radio equipment consists of RF equipment (transceivers and antenna interface equipment), controllers, and power supplies.

User equipment nodes in the radio network connect to the radio access network through the eNB nodes. User equipment nodes UE can be many types of devices ranging from simple mobile telephones to digital televisions.

Figure 2:
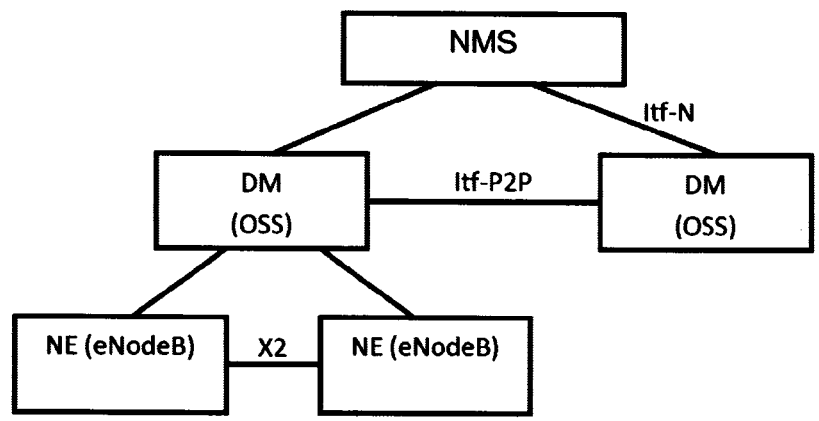

FIG. 2 discloses a general configuration for a network management system NMS wherein the inventive method and arrangement may be used. The node elements (NE), also referred to as eNodeB, are managed by a domain manager (DM), also referred to as the operation and support system (OSS). A DM may further be managed by a network manager (NM). Two NEs are interfaced by X2, whereas the interface between two DMs is referred to as Itf-P2P. In this invention, it is further assumed that any function that automatically optimizes NE parameters can in principle execute in the NE, DM, or the NMS. Such features are referred to as Self-Organizing Network (SON) features.

The invention relates to automated features in radio networks in general and LTE in particular. Self-organizing network features in LTE include, e.g: random access optimization, mobility robustness optimization, mobility load balancing, energy savings, coverage and capacity optimization.

The random access (RA) serves as an uplink control procedure to enable the UE to access the network. The procedure lets the UE align its uplink timing to that expected by the eNB in order to minimize interference with other UEs transmissions. Uplink time alignment is a requirement in E-UTRAN before data transmissions can commence. The procedure also provides a means for the UE to notify the network of its presence and enables the eNB to give the UE initial access to the system. In addition to the usage during initial access, the RA will also be used when the UE has lost the uplink synchronization or when the UE is in an idle or a low-power mode. Random access optimization includes parameters that may be subject to automated adjustments by a network management system. Mobility robustness concerns handover parameter adjustments including adjustment of threshold, indicating how much stronger a certain candidate cell needs to be before it is reported to the serving cell; filter coefficient, applied to the measurement before evaluation triggers are considered; and time to trigger, meaning the time window within which the triggering condition needs to be continuously met in order to trigger a reporting event in the UE. A higher 'too early handover' ratio than desired can be counter-acted by increasing the threshold, delaying the report event trigger. A higher 'handover to wrong cell' ratio than desired can be counter-acted by increasing the threshold towards the first, unwanted, target cell. Handover ping pong and handover short stay may also be considered, meaning that a UE returns from a target cell back to the original source cell within a short period of time or stays only shortly in a target cell, but instead is further handed over to a second target cell within a short time.

Load balancing aims at evening out the load between cells in order to avoid overload in the system, to enable good equipment utilization, and to support fairness between users. If the load of one cell is much higher than in an adjacent cell, the threshold for handover report triggering from the highly to the less loaded cell may be decreased in an automatic adjustment initiated by a network management system.

In order to operate the system efficiently in terms of energy consumption, resources may be disabled during low traffic periods. One example is that some antennas but not all associated to a cell are disabled. This means reduced capacity, but maintained coverage. Sites may also be disabled provided that other cells contribute with coverage in the service area of the disabled cell.

Long term coverage and capacity optimization concerns adjusting cell and antenna parameters to ensure an adequate coverage over the intended service area, possibly also considering user densities to provide capacity where it is needed. It can be based on cell observations of received signal strength or perceived data rate by UEs reported to the system. Such reports may be localized to provide a better analysis of the coverage and/or user density. The antenna parameters may include the antenna down-tilt and azimuth, as well as antenna beam width. The cell parameters include cell pilot power and parameters related to the coverage of various control and data channels. Also the cell load can be considered to even out long term traffic statistics between cells. Long term coverage and capacity optimization can be seen as a more long term mechanism for common channel optimization, mobility robustness optimization and mobility load balancing.

Figure 3:
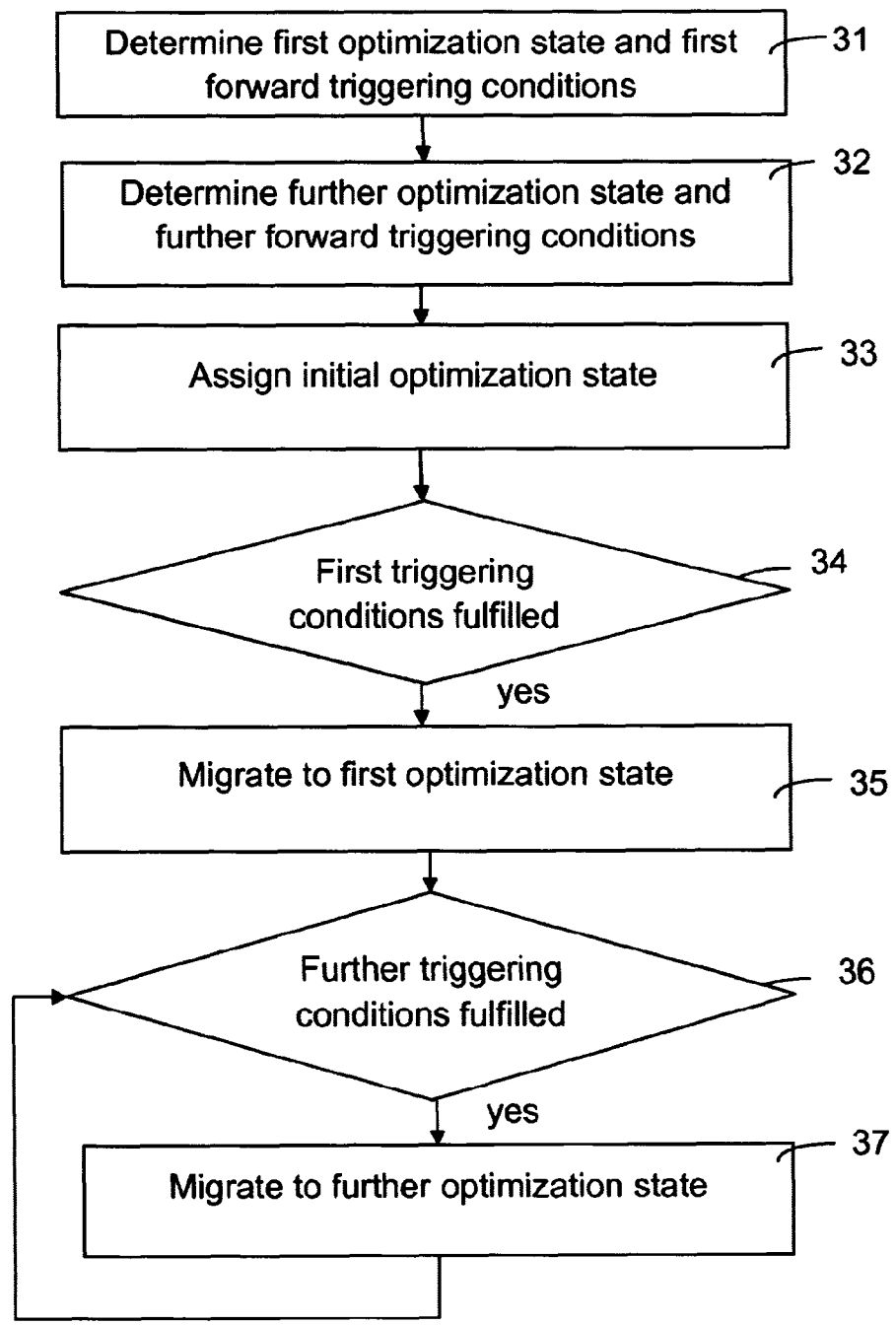
Figure 4:
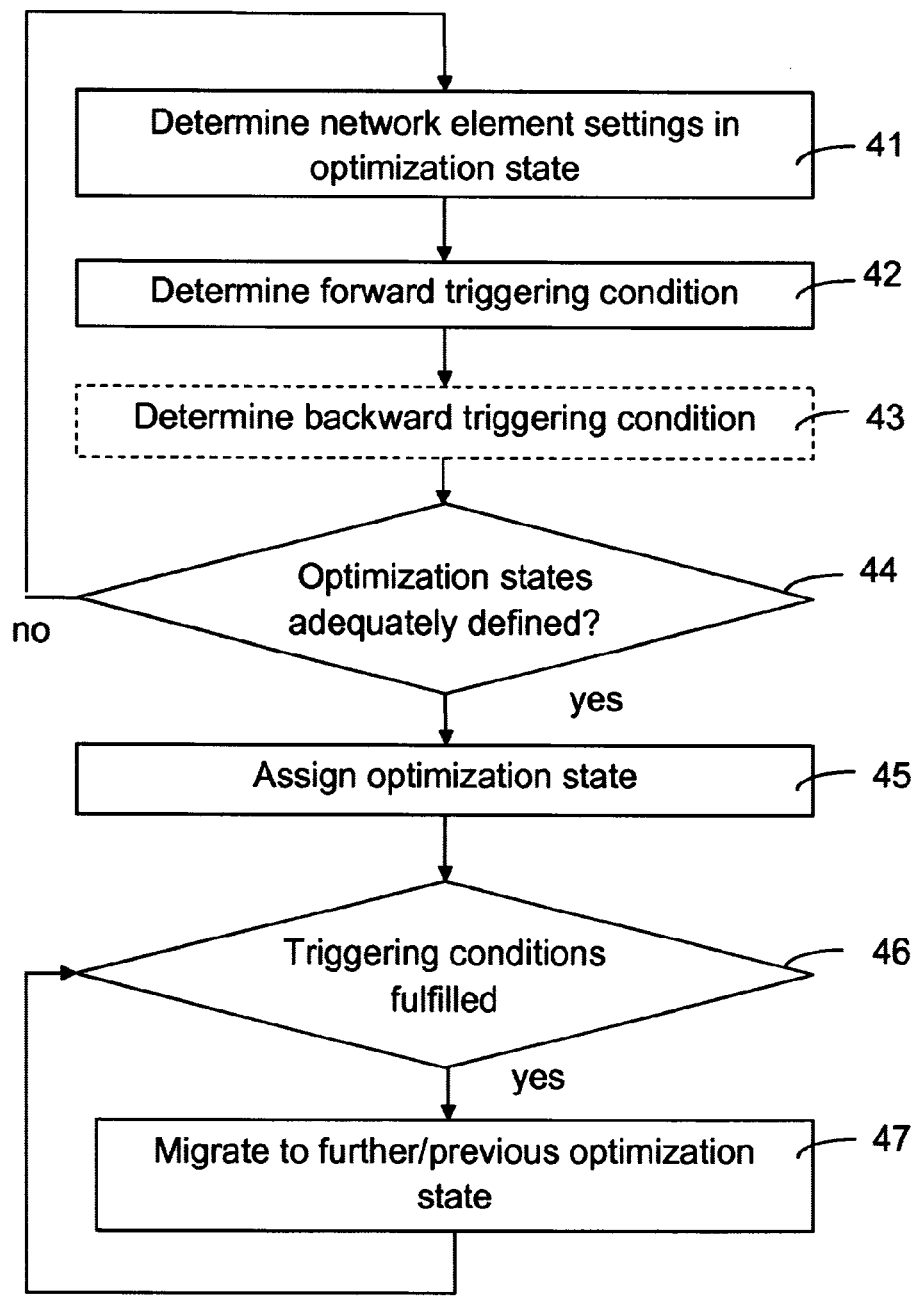

FIG. 3 discloses an embodiment of the inventive method, whereby automated optimization is gradually introduced in a set of automated optimization states. FIG. 4 discloses another embodiment of the inventive method. FIG. 5a-d schematically illustrates an embodiment of the inventive method applied to for three optimization states, starting at an initial optimization state SI with its most limited range of network element settings. The initial optimization state SI represents a state in a network management system where an automated optimization arrangement can be considered as disabled, with fixed network element settings manually provided by the operator or pre-configured in the network.

In a first automated optimization state S1, a first range of network element settings is characterized by one or more limitations. The network element settings include one or more adjustable parameters. The limitations may include a min and/or a max value of a parameter, a minimum time for allowing parameter update, a specified parameter updating frequency, or a limited range of allowed requirements to base the parameter update on, restricting excessive requirements. The first automated optimization state S1 will usually associate with relatively narrow parameter ranges for some or all parameters. In the first state, some or a dominating part of the network element settings may also remain fixed.

In a further automated optimization state SF, an even less limited range of network element settings is allowed and the state may be associated with relatively wide parameter ranges for some or all parameters. It is of course possible to include additional further optimization states SF in an embodiment of the inventive method. A final automated optimization state is a further optimization state representing a least limiting range of network element settings.

In the embodiment disclosed in FIG. 3, a first optimization state is determined in step 31. The optimization state includes a first range of network element settings allowable in an automated optimization of the network element settings performed in a network management system. A first forward triggering condition is also associated with the first optimization state. In step 32, a further optimization state is determined. A range of network element settings to be applicable for the further optimization state are determined. A further forward triggering condition associated with a step of initiating the further optimization state is also determined. An initial set of network element settings to be applied in management of an wireless access network are assigned 33 to network elements in the access network. These network settings represent an initial optimization state. In the process of network management, performance measurements from network elements are received and evaluated 34 with regard to fulfillment of the first forward triggering condition. Upon fulfillment of the first triggering condition a migration 35 to to the first optimization state is performed. In a corresponding manner, fulfillment of the further triggering conditions is evaluated 36 and migration 37 to a further optimization state performed upon fulfillment of the further triggering condition.

In step 41, network element settings in an optimization state are predetermined. The network element settings may include specific parameter settings to be applied on network elements in the wireless network, but the settings may also include a range of settings allowable for a more automated optimization. In the inventive method at least three optimization states are foreseen, wherein an initial state SI involves the most limited range of network element settings and may be associated with only fixed parameter values, i.e., disabling the ability for automated optimization in the access network. A less limiting range of network element settings are foreseen in a first optimization state S1. However, this state may be associated with a relatively narrow parameter range for some or all parameters. Some parameter values may also remain fixed allowing no automated adjustment relating to these parameters. The network element settings in a further optimization state SF, may be provide a relatively wide parameter range for some or all parameters, or a combination of a wide parameter range, a more narrow parameter range for some network element settings and fixed settings for some parameter value. However, the further optimization state SF does provide a possibility for more automated optimization then what is possible in the first optimization state S1 or any other previous optimization state. A final optimization state represents a least limiting range of network element settings. In this optimization state, parameters may be freely adjustable. However, the final optimization state could also include limitations relating to some parameter settings and even fixed values. During the step of determining a range of network element settings to be applied for a specific optimization state, a hysteresis for implementing the new settings will also be determined.

Network element settings included in the various automated optimization states may include, e.g.:
 a limited range for adjustable parameters, e.g. a min value and/or a max value of the parameter, but also that some parameters are limited to a fixed value
 a minimum time between parameter updates, or a specified updating frequency, which then may also be related to an associated averaging
 a limited range of allowed requirements, restricting excessive requirements Further examples of limitations include
 the available root sequences from which random access preambles are derived are limited to a set of root sequences for new sites.
 The set of root sequences includes only root sequences that are considered to have relatively good coverage.
 The preambles are always repeated to allow good coverage
 The desired power level at the base station is limited to a range
 The power increase step is limited to a smaller set than allowed by the standard
 The number of available random access configurations is restricted to a smaller set than allowed by the standard
 One or more of the handover parameters for mobility robustness optimization are restricted to a smaller set than allowed by the standard
 One or more of the handover parameters for mobility load balancing are restricted to a smaller set than allowed by the standard
 One or more of the evaluation parameters for load balancing are restricted to a smaller set than allowed by the standard for handover purposes
 Only antennas are allowed to be disabled for energy savings, but the entire node must be operational and at least one antenna enabled.
 The antenna tilt angles must remain within a number of degrees from the antenna tilt nominal value.
 The antenna beam widths must remain within a number of degrees from the antenna beam width nominal value.
 Configurations determined by the automated optimization mechanism are established but not effectuated. For example,
  physical cell identifier confusion (two neighbors of a third cell are assigned the same) and collisions (overlapping cells are assigned the same) are automatically identified, but not automatically resolved
  a cell outage is detected, but no compensation means are initiated
  neighbor cells are automatically identified, but are not automatically enabled for handover In a step 42, one or more forward triggering conditions are defined for an automated optimization state. The forward triggering condition is a condition that needs to be fulfilled prior to allowing more automated network management. The ability to adjust network element settings in the radio access network may be increased when:
 A timer has expired, e.g. as if the autonomic mechanism is gradually introduced.
 The operator has manually intervened
 Performance statistics in the current phase with respect to one or more KPIs associated to the autonomic mechanism is acceptable, e.g. a performance statistics metric is above a threshold, a performance statistics metric is below a threshold.
 The traffic load of the cell/cells is below (above) a threshold, e.g. automatic mechanisms are carefully introduced in areas with high traffic.
 The importance of the cell/cells is below a critical importance, e.g. autonomic mechanisms are evaluated in regions without critically important cells and nodes. For example a macro cell can be more critical than a pico cell.
 Less important services are used in the cell. A service is considered to be less important if it brings relatively small revenue contribution to the operator There are relatively few important (gold) subscribers in the cell or area, where the important users have high requirements on the service performance There is another equivalent RAT-layer, for example HSPA which covers an area served by LTE. In this case HSPA can cover the area in case the LTE SON features take inappropriate actions resulting in loss of coverage.

Other network element settings can change automatic optimization state.

The same or other conditions may also be applicable for determining backward triggering conditions in step 43. The backward triggering condition initiates a less automated working condition for management of the radio access network.

In order for the inventive method to be applicable in a satisfactory manner, determination of at least three optimization states is required. In step 44, a check is performed that optimization states according to the need of the operator are available, and that these optimization state are each associated with a pre-determined range of network element settings, forward triggering conditions, and backward triggering conditions where applicable. Following a positive outcome of this check, an assignment of an optimization state is performed in step 45. The step 45 relates to assignment of an initial optimization state SI, being the most limited optimization state. However, it is also foreseeable that the optimization state assigned in step 45 could be a less limited optimization state such as the previously described first optimization state. This would depend on the amount of trust and previous experience by the operator when it comes to introducing self-organizing features in a network.

Performance measurements are continuously being performed in the network and these measurements are used to evaluate fulfillment of triggering conditions in step 46. The evaluation may include forward triggering conditions as well as backward triggering conditions depending on the optimization state assigned in step 45. If one or more forward triggering conditions are fulfilled, migration to a further optimization state may be performed in step 47. Correspondingly, if one or more backward triggering conditions are fulfilled, migration to a previous optimization state may be carried out.

A forward triggering condition and a backward triggering condition from the same optimization step, may relate to different performance measurements or network aspects. Thus, the situation could arise when all the forward triggering conditions are fulfilled as well as the backward triggering conditions. The inventive method, provides the option for an operator to determine if a forward triggering condition should be higher prioritized than a backward triggering condition or vice versa, so that migration to an optimization state is performed regardless of the contradiction of the triggering conditions. In accordance with the inventive method, such a contradiction could also be solved by allowing the maintaining the present optimization state.

The situation can also be foreseen where performance measurements fulfilling the conditions of a final optimization or a further optimization state are provided at a very early optimization state. For such a situation, the operator may also establish rules that allow migration to a final optimization state without migration through the intermediary optimization states.

The step 47 wherein migration to a further or previous optimization state is performed, will be repeated when it is determined that further triggering conditions are fulfilled. It is assumed that evaluation of performance measurements or network aspects relating to triggering conditions are continuously received to enable optimization adjustments at any time during operation of the network management system and the network elements controlled by this network management system.

FIG. 5a-5d schematically discloses an embodiment of the inventive method applied to for three optimization states SI, S1 and SF. A first forward triggering condition concern mobility robustness optimization and handover parameter adjustments. Essentially three situations should be avoided Too early handover, meaning that the a UE is handed over too a candidate cell too early, which may mean that the UE returns soon to the source cell (handover ping pong)

Too late handover, meaning that the UE is handed over late to the target cell, so that the link to the source cell breaks before completing the handover.

Handover to wrong cell, meaning that the UE is first handed over to one target cell and soon thereafter handed over to yet another cell. Most probably, it would have been better to have handed over the UE to the last target cell directly.

In an initial optimization state, a first threshold is defined indicating how much stronger a candidate cell needs to be before it is reported to a serving cell. In the initial state, this threshold will be preset with no option for the network management system to alter this upon measurements indicating any of the three situations mentioned above. The settings in the initial optimization state may also include an operator define filter coefficient, and a time window within which the threshold condition needs to be met in order to initiate the reporting event. In the initial optimization state, the mobility robustness settings will be fixed, not allowing any automatic adjustments to counteract a too early handover ratio. A forward triggering condition may be defined that determines that migration 111 to a less limited optimization state should be performed following a specified period of time T in the initial phase. During the first optimization state S1, a new set of handover parameters controlling the reporting are introduced. These handover parameters are defined as a range of network settings allowed in the system, but where the automated network management system may determine the actual setting in an automated process. Following a new time period 2T, migration 112 to a further optimization state may be performed. The allowed range of settings in this optimization state will include a range of thresholds allowed in the mobility robustness optimization, wherein the actual value for the specific threshold implemented in the system is automatically determined in the network management system.

Figure 5A:
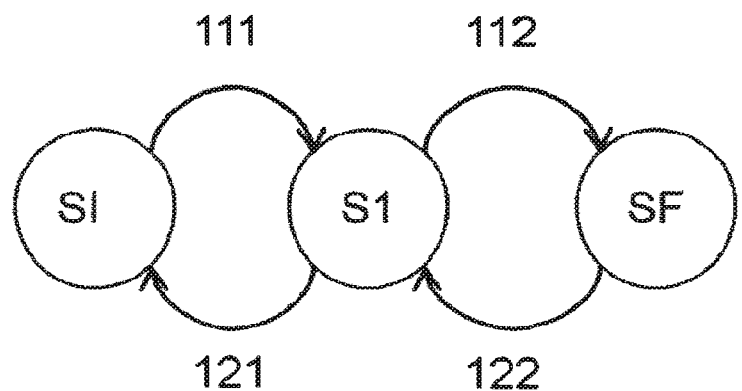
Figure 5B:
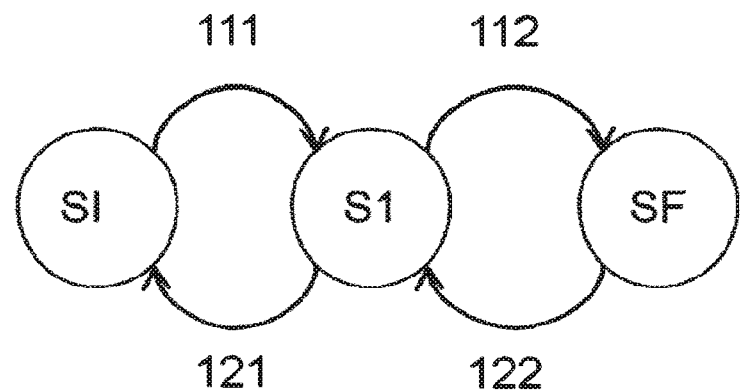
Figure 5C:
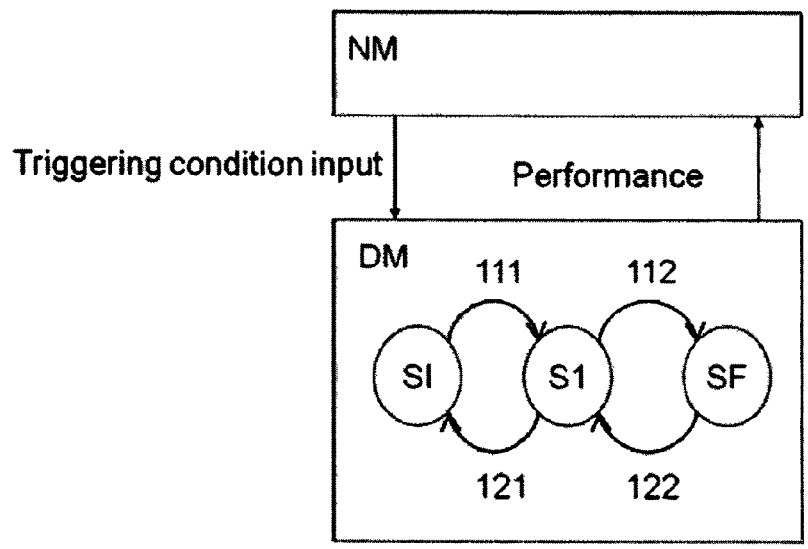
Figure 5D:
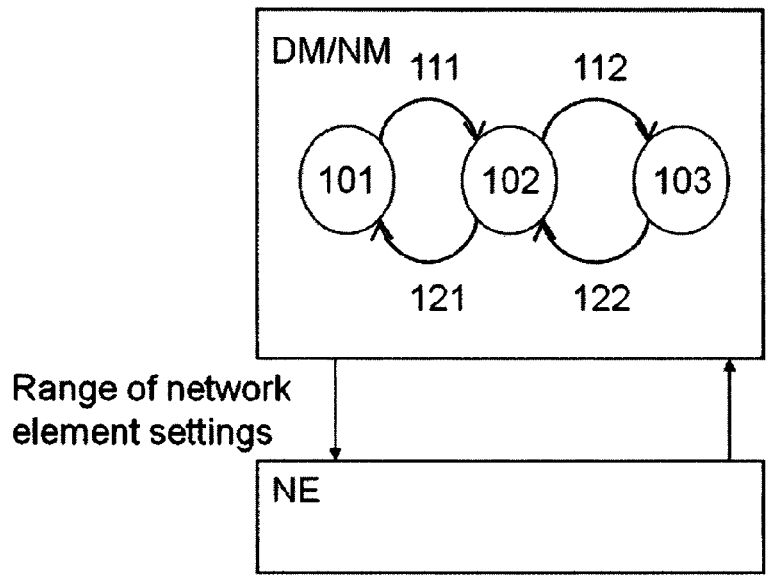

FIG. 5a-5d also illustrates migration to previous optimization states following fulfillment of backward triggering conditions. Migration 121, 122 may be based on mobility load balancing aspects, aiming at evening out the load between the cells. In a final optimization state, an ability for the network management system to freely determine thresholds for handing over user equipment from one cell to another may influence the load situation in the cells. A backward triggering condition migrating the management system to a more limited optimization state, may provide for more predictable traffic conditions, something that is usually desired by the operator. FIG. 5a discloses the overall principles for the migration, whilst FIG. 5b-5d discloses where the inventive method may be practiced in the network management system. The inventive method is not limited to a specific node in the NMS, but the steps of the method may in any NMS node.

The automated optimization mechanism can be enabled and disabled via management interfaces. FIG. 5 discloses a functional overview of an arrangement for automated optimization of network elements. The automated optimization mechanism can be considered disabled if is in its initial optimization state with its most limited range of network element settings. Similarly, the automated optimization mechanism can be considered fully enabled if is in its last optimization state with its least limited range of network element settings.

The i mechanism can provide information to the OaM about its operation, for example information about how often it has been in the different optimization states, how often different triggering conditions have been met, how often the optimization state changes from a more limited to less limited and back to a more limited state.

Figure 6:
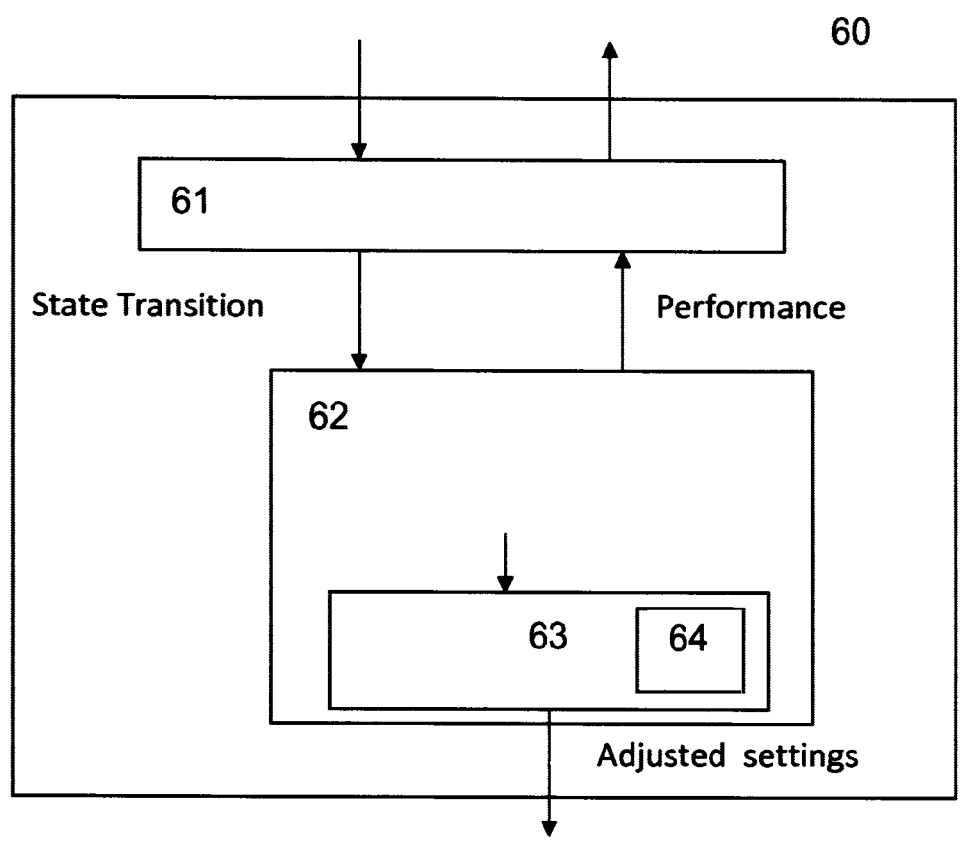

In FIG. 6, a limiter includes a memory storing the parameter settings to be applied for network element settings in the radio access part of the network. A limiter is included in an automatic mechanism for the network management system, where the automatic mechanism provides for at least some self-organizing features in the radio access network. A smart migration processor receives performance measurements from the automatic mechanism, but also from other parts of the wireless network. Fulfillment of triggering conditions are evaluated in the smart migration processor that, upon fulfillment of one or more triggering conditions, instructs the automatic mechanism to change optimization state to a more or less optimization state.

The description above discloses the best mode presently contemplated for practising the invention, but should not be perceived as limiting to the invention. The scope of the invention should only be ascertained with reference to the issued claims.

The invention claimed is:

1. A method for automated optimization of network element settings in a wireless network, comprising:
   for a first optimization state determining at least one first forward triggering condition and a first range of network element settings, allowable in first network element settings optimization;
   for at least one further optimization state determining at least one further forward triggering condition, and a further range of network element settings, allowable in a further network element setting optimization;
   assigning an initial set of network element settings in an initial optimization state;
   evaluating the at least one first forward triggering condition;
   migrating to the first optimization state upon fulfillment of the at least one first forward triggering condition;
   evaluating the at least one further forward triggering condition;
   migrating to a further optimization state upon fulfillment of the at least one further forward triggering condition; and
   repeating the step of migrating to a further optimization state until reaching a final optimization state.

2. The method according to claim 1, wherein:
   at least one final backward triggering condition is determined for a final optimization state; and
   at least one further backward triggering condition is determined for a further optimization state;
   further comprising:
   migrating from the final optimization state back to a the further optimization state upon fulfillment of the at least one final backward triggering condition;
   migrating from a further optimization state to a previous optimization state upon fulfillment of the at least one further backward triggering condition; and
   repeating the step of migrating to a previous optimization state until reaching an initial optimization state.

3. The method according to claim 2, wherein the step of migrating to an optimization step according to the at least one forward triggering condition takes precedence over migrating according to the at least one backward triggering condition.

4. The method according to claim 2, wherein the step of migrating to an optimization step according to the at least one backward triggering condition takes precedence over migrating according to the at least one forward triggering condition.

5. The method according to claim 1, wherein one or more intermediary optimization states is omitted upon fulfillment of a further forward triggering condition.

6. The method according to claim 1, wherein the first range of network element settings is more limited than the further range of network element settings.

7. The method according to claim 1, wherein a range of network element settings include settings relevant for random access optimization including at least one of: mobility robustness optimization, mobility load balancing, and coverage and capacity optimization.

8. The method according to claim 1, wherein a forward triggering condition in a current optimization state includes any one or a combination of conditions based on time in the current optimization state, manual operator intervention, performance statistics in current optimization state, traffic load of a corresponding cell or set of cells, and of the cell or set of cells as defined by the operator.

9. The method according to claim 1, wherein the final optimization state represents a most automated optimized state available for the wireless network.

10. An arrangement for automated optimization of network elements in a wireless network, comprising:
   a smart migration processor receiving performance measurements and comparing these performance measurements to triggering conditions predefined in the processor,
   a limiter including a memory storing parameter settings to be applied for network element settings in the radio access part of the network, wherein the parameter settings are grouped in a set of optimization states, and
   an automatic mechanism for self-organized adjustment of network element settings controlled by the limiter, and wherein the automatic mechanism operates according to an optimization state and performs automatic optimization of network element settings in accordance with an optimization state selected in the limiter.

* * * * *